(12) United States Patent
Speth et al.

(10) Patent No.: US 11,040,321 B2
(45) Date of Patent: Jun. 22, 2021

(54) ADIABATIC AXIAL FLOW CONVERTER

(71) Applicant: Haldor Topsøe A/S, Kgs. Lyngby (DK)

(72) Inventors: Christian Henrik Speth, Lynge (DK); Per Juul Dahl, Vedbæk (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/764,655

(22) PCT Filed: Dec. 19, 2018

(86) PCT No.: PCT/EP2018/085897
§ 371 (c)(1),
(2) Date: May 15, 2020

(87) PCT Pub. No.: WO2019/121951
PCT Pub. Date: Jun. 27, 2019

(65) Prior Publication Data
US 2020/0384431 A1    Dec. 10, 2020

(30) Foreign Application Priority Data

Dec. 20, 2017   (DK) ............................. PA 2017 00732

(51) Int. Cl.
*B01J 8/00* (2006.01)
*B01J 8/02* (2006.01)
(Continued)

(52) U.S. Cl.
CPC ............ *B01J 8/0257* (2013.01); *B01J 8/0285* (2013.01); *B01J 8/06* (2013.01);
(Continued)

(58) Field of Classification Search
CPC ..... B01J 8/00; B01J 8/02; B01J 8/0242; B01J 8/0257; B01J 8/0285; B01J 8/04; B01J 8/0446; B01J 8/0461; B01J 8/0469; B01J 8/0496; B01J 8/06; B01J 2208/00; B01J 2208/00008; B01J 2208/00017; B01J 2208/00106; B01J 2208/00168;
(Continued)

(56) References Cited

U.S. PATENT DOCUMENTS

| 4,180,543 A | 12/1979 | Ward |
| 4,482,523 A | 11/1984 | Peterson |

(Continued)

FOREIGN PATENT DOCUMENTS

| EP | 0 202 454 A2 | 11/1986 |
| EP | 0 253 350 A2 | 1/1988 |

(Continued)

*Primary Examiner* — Natasha E Young
(74) *Attorney, Agent, or Firm* — Blank Rome LLP

(57) ABSTRACT

In an adiabatic axial flow converter, in which process gas passes from an outer annulus via a catalyst bed, wherein the process gas is converted to a product, to an inner centre tube, the catalyst bed comprises at least one module comprising one or more catalyst layers. Feed means are arranged to provide a flow of process gas from the outer annulus to an inlet part of one or more modules, and collector means are arranged to provide a flow of product stream of converted process gas which passes axially through the catalyst bed of one or more of the modules to the centre tube.

14 Claims, 2 Drawing Sheets

Figure 1:
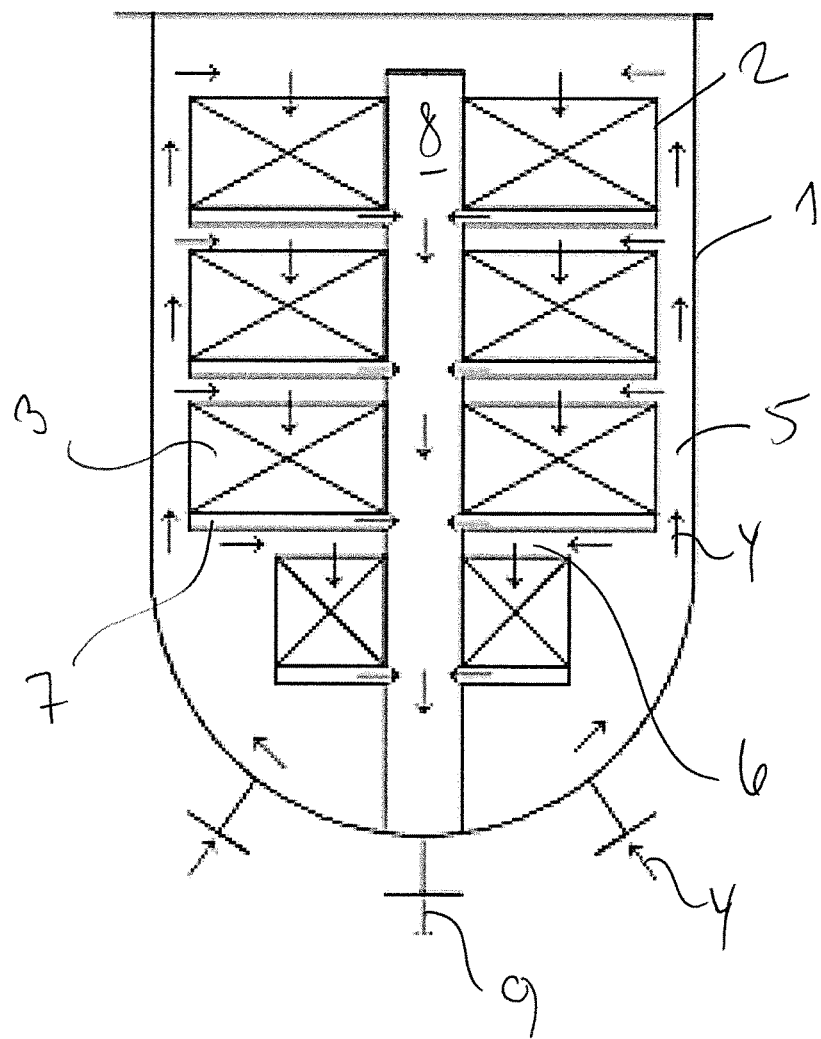

(51) Int. Cl.
  *B01J 8/04*   (2006.01)
  *B01J 8/06*   (2006.01)

(52) U.S. Cl.
  CPC ............... *B01J 2208/00194* (2013.01); *B01J 2208/00938* (2013.01); *B01J 2208/021* (2013.01)

(58) Field of Classification Search
  CPC .... B01J 2208/00194; B01J 2208/00318; B01J 2208/00327; B01J 2208/00336; B01J 2208/00353; B01J 2208/00371; B01J 2208/00796; B01J 2208/00938; B01J 2208/02; B01J 2208/021
  See application file for complete search history.

(56) References Cited

U.S. PATENT DOCUMENTS

| | | | |
|---|---|---|---|
| 4,755,362 A | | 7/1988 | Zardi |
| 4,789,527 A | * | 12/1988 | Osman .................. B01J 8/0005 165/66 |
| 5,236,671 A | | 8/1993 | Grotz |
| 5,352,428 A | | 10/1994 | Bhakta et al. |
| 7,081,230 B2 | * | 7/2006 | Blanchard .............. B01J 8/0469 422/148 |
| 2017/0073242 A1 | | 3/2017 | Gorval |

FOREIGN PATENT DOCUMENTS

| | | | | |
|---|---|---|---|---|
| EP | 0 254 936 A2 | | 2/1988 | |
| EP | 1 419 813 A1 | | 5/2004 | |
| EP | 3115338 A1 | * | 1/2017 | ........... C01C 1/0417 |

* cited by examiner

ADIABATIC AXIAL FLOW CONVERTER

This application is a national stage application claiming priority to PCT/EP2018/085897, now WO/2019/121951, filed on Dec. 19, 2018, which claims priority to Danish Patent Application Serial No. DKPA 2017 00732, filed on Dec. 20, 2017.

The present invention relates to an adiabatic axial flow converter, in which process gas passes from an outer annulus via a catalyst bed wherein the process gas is converted to a product, to an inner centre tube.

More specifically, the invention relates to the techniques of isothermal or pseudo-isothermal chemical reactors. It is known that isothermal or pseudo-isothermal chemical reactors are provided with an internal heat exchanger, adapted to provide heat to or remove heat from the chemical reaction which is generated in the reactor itself. The heat exchanger is usually inserted into a catalytic layer inside the reaction zone, and it serves to keep the temperature of the reactants within an ideal range compensating for the production or absorption of heat of the reaction itself. Among other uses, isothermal reactors are commonly used in plants for the production of methanol or ammonia, whose synthesis reactions are exothermal.

In the field of industrial production of chemical compounds such as methanol and ammonia, there is a well-known need of developing processes of heterogeneous synthesis with a high conversion yield of the reactants and plants with large capacities, at low investment costs and low energy consumption. To this purpose, reactors for catalytic chemical reactions are known that comprise a substantially cylindrical outer shell, equipped with suitable inlets/outlets for reactants and reaction products, and containing a catalytic layer in which a heat exchange unit is embedded that is capable of taking heat away from the reactant gases, if the chemical reaction is exothermal, or vice versa supplying heat if the chemical reaction is endothermal. Such reactors are known as "pseudo-isothermal" or, more simply, "isothermal", since the heat exchange unit maintains the temperature in the reactor within a pre-determined range.

Ammonia converters are complicated due to the fact that, as mentioned, the synthesis of ammonia from nitrogen and hydrogen gas (in an approximate ratio of 1:3) is exothermic, and the reactions take place at high temperatures and pressures. Thus, inter-stage cooling is generally used between a series of catalyst zones to maintain kinetic and equilibrium conditions appropriate for optimum conversion efficiency. There must also be provisions made for servicing the catalyst zones, e.g. periodically removing and replacing catalysts when they lose their effectiveness.

Because ammonia converters are complicated, but also very important pieces of equipment, many efforts are made to improve their efficiency. Thus, US 2004/0096370 A1 discloses a split-flow vertical ammonia converter, in which a fixed-bed catalyst zone is configured into two mechanically separated catalyst volumes and two gas streams operating in parallel. This design maintains the ratio of gas flow to catalyst volume so that there is no catalyst effectiveness loss. The catalyst beds and gas flow paths are configured so that the gas flow is downwards through each catalyst volume.

According to US 2008/0014137 A1, ammonia is produced in a converter in which pseudo-isothermal conditions can be approached by convection cooling of a reaction zone by positioning at least a portion of said zone in indirect contact with a flow of hot gas, such as exhaust gas or pre-heated air.

The use of axial-radial flow reactors in synthesis processes is not novel in itself. It is e.g. disclosed in U.S. Pat. No. 5,427,760, which describes axial-radial reactors in the Braun synloop with external heat sink. In U.S. Pat. No. 4,372,920, an axial-radial reactor for use in heterogeneous synthesis is described, and U.S. Pat. No. 5,352,428 deals with high-conversion ammonia synthesis. FIG. 4 of the latter US patent is an illustration of an axial-radial flow reactor suitable for use in the apparatus and process described.

US 2002/0102192 A1 describes a catalytic reactor wherein an axial-radial flow may be achieved with the consequent advantages of a reduced pressure differential, but without any "complex reactor internals". The reactor has inlet and outlet ports and a bed of particulate catalyst disposed round a central region communicating with one of the ports and presenting less resistance to flow than the catalyst particles. The central region within the catalyst bed has a height equal to at least a major part of the height of the catalyst bed, and the exterior surface of the catalyst bed less than that of the reactor, thus leaving a space between the exterior surface of the catalyst bed and the interior walls of the reactor, said space being filled with a particulate material with less resistance to flow than the catalyst particles.

In EP 2 167 226 B1, a wall system for catalytic beds of reactors for heterogeneous synthesis of chemical compounds is disclosed. The reactors are equipped with fixed catalyst beds crossed by a gaseous flow of synthesis gas, particularly with axial-radial flow. The design may resemble that of the present invention, but the canister concept is not envisaged.

A multi-bed catalytic converter with inter-bed heat exchangers, comprising a plurality of superimposed catalytic beds and a common heat exchanger, is disclosed in EP 2 759 338 A1. The design of this converter does not have much in common with the design of the axial/radial flow converter of the present invention.

Finally, US 2004/0204507 A1 describes a cooled axial/radial flow converter comprising an annular catalyst bed and a plurality of cooling panels arranged in a radial pattern inside the catalyst bed and surrounding a central pipe. The catalyst bed and the shell of the converter forms an outer annulus through which a process gas is passed to the catalyst bed. The process gas flows in axial-radial direction through the catalyst bed and is subsequently collected in the central pipe. The axial/radial flow converter of the present invention differs from that of the US application in that the catalyst bed is divided into a number of identical modules stacked on top of each other and also in that the process gas is passed through the cooling panels to pre-heat the gas.

When low pressure drop is required in a fixed bed catalytic converter, a radial flow type converter is often selected.

However, in special cases, such as a cooled catalyst bed, catalyst shrinkage or catalyst particles having low strength combined with a high catalyst bed, this solution is not practical, and instead inter-bed cooling or parallel reactors must be selected.

A solution could consist in replacing the radial flow bed with a stack of identical axial flow canisters. Although the flow through each individual canister is axial, the assembly can have a flow pattern as a radial flow reactor, for instance taking feed flow from an outer annulus and disposing the reactor effluent to an inner tube. The bed height can be adjusted to meet the requirement for pressure drop and catalyst strength without changing the principal layout of the reactor.

Thus, the present invention relates to adiabatic axial flow converter, in which process gas passes from an outer annulus via a catalyst bed wherein the process gas is converted to a product, to an inner centre tube, wherein the catalyst bed comprises at least one module comprising one or more catalyst layers having a height hcat, feed means are arranged to provide a flow of process gas from the outer annulus to an inlet part of one or more modules, and Collector means are arranged to provide a flow of product stream of converted process gas which has passes axially through the catalyst bed of one or more of the modules to the centre tube.

When the converter comprises an outer annulus, wherein the process gas flows, feed means for bringing the process gas from the annulus to the inlet of at least one module comprising at least one catalyst layer, as well as collector means for collecting the product stream, i.e. the process gas which has passed through the catalyst in a module and bringing the collected product stream to an inner center tube, several advantages are achieved, such as:

The reactor shell is kept at the lowest possible temperature in case of an exothermic reaction The modules comprising the catalyst(s) enables easier loading/unloading as the modules may be loaded with catalyst outside the converter The modular design enables internal split flow considerably reducing the overall reactor dP The unique module design enables use of modules with variating diameter for better utilization of the reactor volume The modular design enables a low reactor diameter/height ratio reducing plot area and making transportation easier.

In a further preferred embodiment of the axial flow converter, the converter is arranged for two or more of the modules to be operated in parallel and/or in series. Especially a parallel modular arrangement enables a reactor design with overall low pressure drop in axial flow catalyst beds. Modules may be arranged in parallel in order to reduce pressure drop while modules may be arranged in series in order to increase conversion.

Preferably the converter is arranged to ensure that the pressure drop Dp (and thereby the space velocity, spv) is the same within ±5% across modules operated in parallel. This will ensure equal gas distribution per catalyst between the modules i.e. in order to provide an equal or close to equal flow of process gas through the modules. Preferably the pressure drop difference between modules are close to 0% as this will ensure equal gas distribution between the modules whereby optimal reactor performance is ensured.

Each module may comprise one or more adiabatic catalyst layers, said adiabatic layer(s) having a diameter dadi, a cross sectional area Aadi and a height Hadi, where the height Hadi of the adiabatic catalyst layer/layers in modules operated in parallel are identical ±5%, preferably +−0% in order to provide a converter with an optimized flow through all the modules in the reactor. Each module operated in parallel preferably contain identical type of catalyst.

The modules may preferably have identical or close to identical catalyst height and/or contain identical type of catalyst.

Thus, it is preferred that modules operated in parallel have the same catalyst configuration whereas modules operated in series may have different configurations of catalyst as the ideal requirements of nearly identical dP across the modules does not apply to the serial modules.

In general, it may desirable to have similar space velocity through at least some of—preferably all of—the modules in order to ensure equal conversion of the process gas as it passes through the modules.

So preferably the modules are arranged to achieve similar space velocity through each of modules working in parallel. For example, all modules may have the same height containing the same catalyst layers. The diameter of the modules may vary, e.g. in order to physically fit into different areas of the converter, as long as the catalyst configuration is the same in all the modules catalyst.

A reactor shell typically has a bottom and sometime also a top spherical or ellipsoidal section with reduced diameter. It is an important feature of the invention that the modules are allowed to be different in diameter also when operated in parallel which may be achieved when the above module requirements are met as equal gas distribution per catalyst area will still be achieved.

Each or some modules may be provided with means to enable the removal and/or insertion of the module from/to the reactor to allow loading/unloading/maintenance outside the reactor.

The module(s) preferably has a diameter which is smaller than the inner diameter of the converter/reactor vessel, leaving an outer annulus wherein the incoming raw gas can distribute to the relevant modules.

Each module is preferably further provided with an inner center tube wherein the product gasses are collected prior to leaving the modules.

The reactor may be arranged with two or more module sections, each module section containing one or more modules. The sections may be separate in order to be able to have different flow and pressure conditions in the sections.

A quenching zone may be arranged to quench the product gas from at least one module section, thereby obtaining a quench product stream in which case the converter further may comprise means to provide at least part of the quench product stream as feed for one or more subsequent sections.

Fresh process gas and/or partly converted, optionally cooled process gas can be used as quench gas. Use of quench is a method of reducing the reactivity of gas and remove heat from an exothermic reaction The modules in different module sections may be different from each other, contain different catalyst and be arranged differently. For example, the modules in a first section, receiving a very reactive fresh unmixed process gas, may be operated at a lower temperature and contain a less reactive catalyst than the modules in a subsequent section, which receives the product gas from the first section (optionally mixed with e.g. cooled process gas), which is less reactive than the unmixed unreacted process gas received by the modules in the first section.

The at least two or more module sections may be arranged to operate in parallel to achieve an overall low pressure drop. An example could be to parallel sections, each section containing two module operating in series. Such a design will give a considerably lower pressure drop for the double space velocity.

Alternatively, two or more module sections are arranged to operate in series with a quench zone between a first and a second module sections. The module arrangement in each section can in this case variate.

A combination of parallel and series sections operation is also possible if required by the reaction process. Some modules section may be arranged in parallel in order to reduce pressure drop while others may be arranged in series in order to increase conversion.

Without being limited thereto, the axial flow converter according to the present invention can be used as ammonia reactor, methanol reactor, methanisation reactor or shift reactor, and it can further be used in connection with other reaction processes.

Thus, by the present invention is provided a converter comprising a modular cat bed which provides a very high degree of flexibility. The modular structure allows highly specialized convertors/reactors and catalyst beds specially adapted to fulfill the needs of various processes and reactor limitations. The physical properties of the modules may be varied and optimized for example to accommodate modules with a smaller radius in top and/or bottom of the reactor and allowing full diameter modules where the convertor vessel is widest. The modular structure also enables highly specialized catalyst bed with different catalysts in different sections of the converter as well as providing quench zones between sections where desirable. Depending on the use such as ammonia reactor, methanol reactor, methanization reactor, shift reactor and other exothermic reaction processes, but not limited to this the different parameters of the converter may be changed and optimized. For example, the number of modules in the converter may be varied and the converter may comprise one, two, three or more sections with the possibility of quench zones between all sections or some sections.

The catalyst in the modules may also be varied as each module may be arranged to contain a single catalyst layer or several identical or different catalyst layers. In some embodiments all modules contain the same type of catalyst in the same configuration whereas in other embodiments at least some modules comprise different catalyst or different catalyst configuration i.e. different number of layers, different catalyst layer height(s) etc.

The modular built of the catalyst bed in the convertor furthermore allows some or all of the modules to be loaded outside the convertor vessel and subsequently loaded into the convertor vessel. The fact that the catalyst is arranged in modules also may ease the unloading of the catalyst from the convertor as the modules may be hoisted out one by one. Being able to remove all or some of the modules may not only be an advantage when the catalyst bed needs to be changed, but it may also be highly advantageous during convertor maintenance allowing removal of all of or a part of the catalyst bed which subsequently may be loaded back in module by module even reusing the existing catalyst.

The basic concept of axial—radial flow, where the process gas flows axially through the catalyst bed and flows radially via the collector means to the center tube allows, even with a single module, a convertor with a low pressure drop. Furthermore, the flow of process gas in the outer annulus result in a lower temperature impact on the convertor shell and thereby also a lower outer reactor wall temperature.

The lower pressure drop provided combined with the possibility of having several stacked modules allows tall slim converters having a large catalyst volume with a low diameter.

In the following the invention is further described with reference to the accompanying drawings. The drawings are provided as illustrations of some aspects of the invention and are not to be construed as limiting to the invention.

FIG. 1 shows a schematic view of a cross section of a converter 1 according to the present invention. The converter comprises four modules 2 each having a single catalyst layer 3. The four modules are operated in parallel as process gas 4 passes from an outer annulus 5 to the inlet part 6 of each of the modules. The process gas passed axially through each catalyst bed and is collected in collecting means 7 in relation to each module from where it flows to a center tube 8 and leaves the convertor as product gas 9.

The modules and thereby the catalyst layers vary in diameter as three of the modules have the same diameter and the fourth module situated in the bottom of the converter has a smaller diameter in order to fit in the bottom of the converter. The catalyst layer in the modules have the same height H which means that if the catalyst in each of the four modules are of the same type the pressure drop across each module will be the same.

Figure 2:
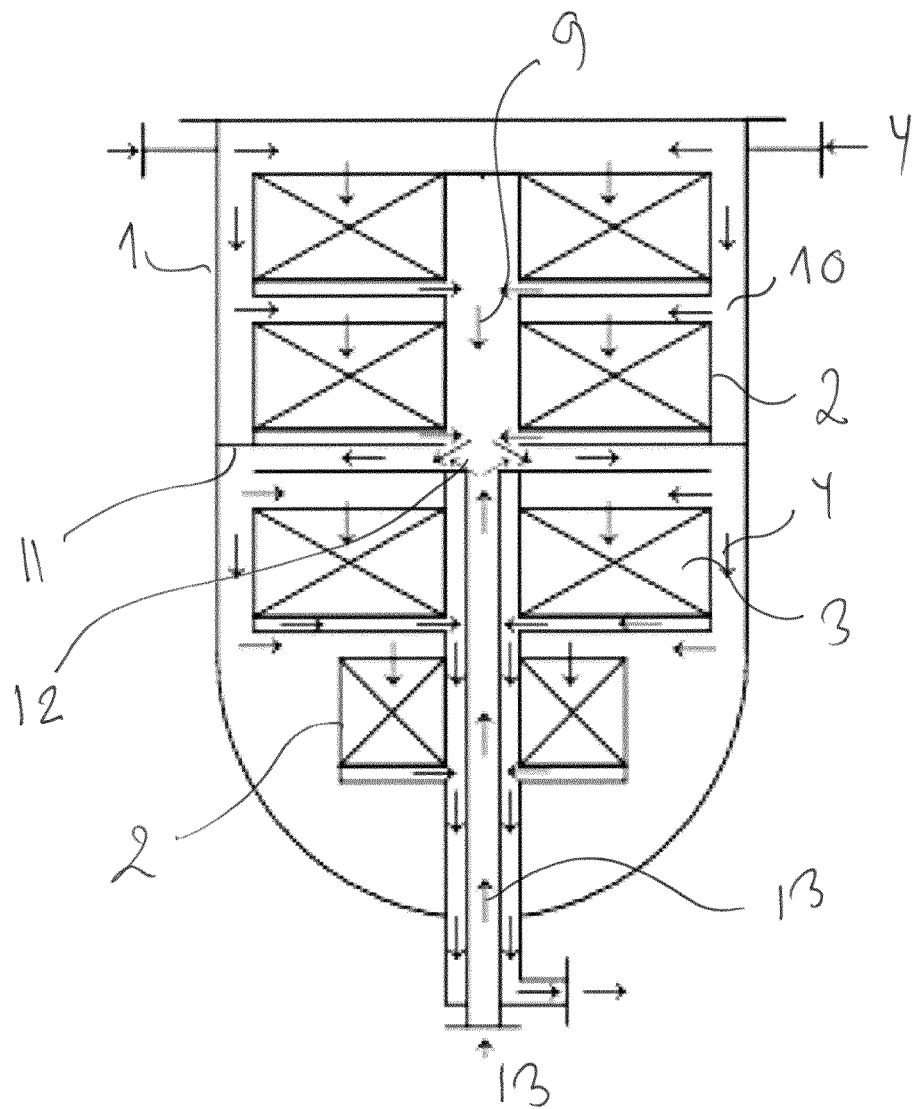

FIG. 2 shows a schematic view of a converter having four modules 2 divided into two section operated in series. The sections are separated by plates or other separating means. The two modules in each section are operated in parallel. Between the sections are a quenching zone in which hot product gas 9 meets colder quench gas before the mix of product gas and quench gas enters the subsequent section and the two modules therein.

The invention claimed is:

1. Adiabatic axial flow converter, in which process gas passes from an outer annulus via a catalyst bed wherein the process gas is converted to a product, to an inner centre tube, wherein
    the catalyst bed comprises at least one module comprising one or more catalyst layers having a height heat,
    feed means are arranged to provide a flow of process gas from the outer annulus to an inlet part of one or more modules, and
    collector means are arranged to provide a flow of product stream of converted process gas which has passes axially through the catalyst bed of one or more of the modules to the centre tube.

2. Adiabatic axial flow converter according to claim 1, comprising two or more modules.

3. Adiabatic axial flow converter according to claim 1, wherein the converter is arranged for two or more modules to be operated in parallel and/or in series.

4. Adiabatic axial flow converter according to claim 1, wherein the pressure drop Dp is the same within +−5% across modules operated in parallel.

5. Adiabatic axial flow converter according to claim 1, wherein the one or more catalyst layers in modules operated in parallel comprises the same catalysts.

6. Adiabatic axial flow converter according to claim 1, wherein the height of the one or more catalyst layers in modules operated in parallel is the same.

7. Adiabatic axial flow converter according to claim 1, wherein the collector means is part of at least one module.

8. Adiabatic axial flow converter according to claim 1, wherein the reactor is arranged with two or more module sections, each module section comprising one or more modules.

9. Adiabatic axial flow converter according to claim 1, comprising a quenching zone wherein the product gas from a section is quenched, obtaining a quench product stream, and,
    wherein the converter comprises means to provide at least part of the quenched process stream as feed for one or more subsequent sections.

10. Adiabatic axial flow converter according to claim 9, wherein fresh process gas or partly converted, optionally cooled process gas is used as quench gas.

11. Adiabatic axial flow converter according to claim 9, wherein the modules in different sections may be different from each other, contain different catalyst and be differently arranged.

12. Adiabatic axial flow converter according to claim 9, wherein at least two or more sections are arranged to operate in parallel.

13. Adiabatic axial flow converter according to claim 9, wherein two or more sections are arranged to operate in series.

14. Adiabatic axial flow converter according to claim 1, which is used as ammonia reactor, methanol reactor, methanization reactor, shift reactor and other exothermic reaction processes.

* * * * *